United States Patent [19]

Nakamura et al.

[11] Patent Number: 5,118,487
[45] Date of Patent: Jun. 2, 1992

[54] PROCESS FOR PRODUCING CHLOROSULFONYL ISOCYANATE

[75] Inventors: Akira Nakamura; Matsuo Ono; Toshiei Ataka; Hideo Shirakawa; Shizuo Noguchi; Hirozo Segawa, all of Nakajo, Japan

[73] Assignee: Kuraray Co., Ltd., Kurashiki, Japan

[21] Appl. No.: 580,868

[22] Filed: Sep. 11, 1990

[51] Int. Cl.$^5$ ............................................. C01B 17/45
[52] U.S. Cl. ............................................................ 423/365
[58] Field of Search ...................... 423/416, 415 R, 365

[56] References Cited

U.S. PATENT DOCUMENTS 3,375,088  3/1968  Onodera et al. ....................... 423/85

FOREIGN PATENT DOCUMENTS 63-77855  4/1988  Japan .
774276    5/1957  United Kingdom .

OTHER PUBLICATIONS

Graf, Angew. Chem. Int'l vol. 7 #3 (1968) pp. 172–173.
Organic Synthesis pp. 226–231.

Primary Examiner—Wayne Langel
Assistant Examiner—Stuart L. Hendrickson
Attorney, Agent, or Firm—Oblon, Spivak, McClelland, Maier & Neustadt

[57] ABSTRACT

Provided is a process for producing chlorosulfonyl isocyanate by reacting sulfur trioxide with cyanogen chloride, which comprises feeding sulfur trioxide and cyanogen chloride simultaneously to the reaction zone and maintaining the temperature of the reacting zone at 10° to 50° C. This is a commercially very simple process and can produce chlorosulfonyl isocyanate with high purity in high yield.

6 Claims, No Drawings

PROCESS FOR PRODUCING CHLOROSULFONYL ISOCYANATE

BACKGROUND OF THE INVENTION

1. Field of the Invention

The present invention relates to a process for producing chlorosulfonyl isocyanate. More specifically, the present invention relates to a process for producing chlorosulfonyl isocyanate with high purity in a high yield.

2. Description of the Prior Art

Chlorosulfonyl isocyanate, also called N-carbonylsulfamoyl chloride, has a chemical formula of $O=C=NSO_2Cl$ and is a useful compound attracting, particularly in recent years, much attention as intermediate raw materials for the production of medicines, agricultural chemicals, sweeteners and the like and improving agents for synthetic fibers, synthetic resins and like materials.

It has been known for long that chlorosulfonyl isocyanate is obtained by reacting sulfur trioxide with cyanogen chloride. See for example Org. Synth. Coll. 5, 226-231; Angew. Chem. Internat. Edit. 7, No. 3, 172-173 (1968); Chem. Ber. 89, 1071-1079, (1956), German Pat. 928,896 (1955) and British Pat. 774,276 (1957).

The former two of the above literature disclose a process for producing chlorosulfonyl isocyanate which comprises adding sulfur trioxide to liquid cyanogen chloride at a low temperature of $-5°$ C. or below. This process, however, has problems in that it must use as large an amount of liquid cyanogen chloride as 1.5-3 times that of sulfur trioxide, thereby being not suited for commercial production both economically and from the viewpoint of safety, that the yield is as low as about 60 to 62%, and that the obtained product is not of satisfactory qualities to meet the demands of market.

The latter three disclose a process which comprises mixing sulfur trioxide with cyanogen chloride at a temperature above 100° C., e.g. 100°-200° C. This process also has problems of difficulty in providing the product with satisfactory qualities, since the flow rates of sulfur trioxide and cyanogen chloride are difficult to control and there form large amounts of byproducts depending on the reaction conditions employed.

On the other hand, U.S. Pat. No. 3,375,088 discloses a process for obtaining a high-purity chlorosulfonyl isocyanate, which comprises treating the crude chlorosulfonyl isocyanate obtained by reacting sulfur trioxide with cyanogen chloride with benzonitrile or its derivatives. However, in employing this process it is necessary to separately provide the process of reacting sulfur trioxide with cyanogen chloride and that of purifying the crude chlorosulfonyl isocyanate, and to further provide a process for recovering and purifying the treating agent including benzonitrile. Accordingly, the whole process is complexed, thereby requiring high equipment cost and time-consuming operation, and hence this process has not been fully satisfactory for commercial production.

In view of the foregoing, we have proposed, for the purpose of solving the problems encountered in the above processes, a process for producing chlorosulfonyl isocyanate which comprises adding cyanogen chloride to liquid sulfur trioxide and reacting them while maintaining the temperature of the reaction system at 20° to 50° C. (Japanese Patent Application Laid-open No. 77855/1988). This process has made it possible to commercially produce in a simple manner chlorosulfonyl isocyanate with a relatively high purity in a relatively high yield, and to solve to some extent the problems of conventional processes, i.e. low yield and purity resulting from formation of byproducts. However, with ever enhancing demands from the market, there has been desired development of a process which can provide chlorosulfonyl isocyanate with a still higher purity in a still higher yield.

SUMMARY OF THE INVENTION

Accordingly, an object of the present invention is to provide a novel process for producing chlorosulfonyl isocyante which can solve the above problems.

Another object of the present invention is to provide a process for producing high-purity chlorosulfonyl isocyanate economically and in high yield by reacting sulfur trioxide with cyanogen chloride.

These objects can be achieved by a process for producing chlorosulfonyl isocyanate by reacting sulfur trioxide with cyanogen chloride, which comprises feeding sulfur trioxide and cyanogen chloride at the same time to the reaction zone and maintaining the temperature of the reacting zone at 10° to 50° C.

DESCRIPTION OF PREFERRED EMBODIMENTS

Any liquid sulfur trioxide can be used in the present invention, but particularly preferred is the $\gamma$ type in view of its high reactivity. The sulfur trioxide may incorporate a stabilizer to prevent polymerization in a small amount, e.g. 0.0001 to 5% by weight, preferably 0.001 to 1% by weight. Examples of the stabilizer generally used are organosilicon compounds, carbon tetrachloride, dimethyl sulfate, boron compounds, phosphorus compounds, aromatic hydrocarbons and aromatic sulfonic acids.

The cyanogen chloride used in the process of the present invention may either be in the gaseous form or liquid, of which the gaseous form is preferred. Cyanogen chloride is commercially produced from hydrocyanic acid and chlorine and generally has a purity of 96 to 99% by weight, one with a purity of at least 95% being also usable.

The most particular feature of the present invention lies in the simultaneous feeding of sulfur trioxide and cyanogen chloride to the reaction zone. The simultaneous feeding may be conducted either continuously or intermittently, but generally employed is a continuous feeding. More concretely, for example, a reaction vessel is equipped with a stirrer and/or a circulation circuit, and gaseous or liquid cyanogen chloride and liquid sulfur trioxide are simultaneously fed through separate feed ports into the reaction vessel and/or circulation circuit. Here, gaseous cyanogen chloride may for example be fed through a gas inlet tube so fitted that its end reaches near the bottom of the reaction vessel, or into the circulation circuit while sulfur trioxide or a reaction solution containing chlorosulfonyl isocyanate is being circulated therein. Liquid cyanogen chloride may for example be fed through a inlet tube similar to the above, or be added dropwise from the top of the reaction vessel. Liquid sulfur trioxide is preferably added dropwise from the top of the reaction vessel.

In the present invention, the temperature of the reaction zone to which cyanogen chloride and sulfur trioxide are simultaneously added is maintained at 10° to 50°

C., preferably at 15° to 35° C. and it is necessary that the reaction be effected at this temperature range. If the temperature of the reaction zone is below 10° C. or higher than 50° C., there will form large amounts of byproducts such as chloropyrosulfonyl isocyanate and 2,6-dichloro-1,4,3,5-oxathiadiazine-4,4-dioxide, thereby lowering both the yield and purity of the obtained chlorosulfonyl isocyanate, which is not preferred.

In the reaction of the present invention, it is preferred that cyanogen chloride be fed per unit time in a mole ratio based on the mole of sulfur trioxide of 0.6 to 1.1, more preferably 0.8 to 1.0 and most preferably 0.9 to 1.0. If the feed mole ratio based on the mole of sulfur trioxide per unit time is less than 0.6 or more than 1.1, byproducts will tend to form in larger amounts, whereby both the yield and purity of the product decreases.

The feed rates of cyanogen chloride and sulfur trioxide are appropriately adjusted in such ranges that can keep the temperature of the reaction zone within the range of from 10° to 50° C., preferably from 15° to 35° C.

In the reaction of the present invention, while the feed of cyanogen chloride and sulfur trioxide are generally started simultaneously, the feed of sulfur trioxide may first be started with that of cyanogen chloride started a little later. However, the feed of cyanogen chloride should not first be started, because, then, formation of byproducts sometimes becomes more marked to thereby lower the yield and purity.

In the present invention, the reaction zone can previously be charged with sulfur trioxide or a liquid containing chlorosulfonyl isocyanate, before the start of feeding cyanogen chloride and sulfur trioxide. In this case preferably employed for the purpose of achieving higher yield is a method of starting the feeding of cyanogen chloride and sulfur trioxide while the above precharged liquid is being stirred or circulated. For instance, a preferred embodiment of this method comprises, while circulating the precharged liquid in a circulation circuit mounted on the reaction vessel, continuously feeding cyanogen chloride into the circulation circuit and, at the same time, continuously feeding sulfur trioxide into the reaction vessel.

The liquid containing chlorosulfonyl isocyanate referred to in the present invention means any liquid containing and dissolving chlorosulfonyl isocyanate in an amount of, preferably, at least 40% by weight, more preferably at least 60% by weight. This liquid may further contain at least one member selected from the group consisting of sulfur trioxide, chloropyrosulfonyl isocyanate, pyrosulfuryl chloride, sulfonyl diisocyanate, sulfur dioxide and chlorine.

The overall amount of the cyanogen chloride used in the reaction of the present invention is generally in a mole ratio based on the total moles of sulfur trioxide used of 0.8 to 1.3, preferably 0.9 to 1.1.

Also in the case where the feeding of sulfur trioxide is started prior to that of cyanogen chloride or where a liquid containing chlorosulfonyl isocyanate is charged beforehand, it is preferred that, for the time period during which cyanogen chloride and sulfur trioxide are simultaneously fed, cyanogen chloride be fed per unit time in a mole ratio based on the mole of sulfur trioxide of 0.6 to 1.1, more preferably 0.8 to 1.0 and most preferably 0.9 to 1.0. Where the feeding of sulfur trioxide is ended prior to that of cyanogen chloride, cyanogen chloride alone can further be fed in such an amount that the total amount of cyanogen will be in a mole ratio based on the total moles of sulfur trioxide used of 0.8 to 1.3, preferably 0.9 to 1.1.

The chlorosulfonyl isocyanate prepared by the above process is purified by distillation. The distillation can be conducted through a conventional distillation column, while the reaction mixture in the reaction zone is being continuously withdrawn or after the total amount thereof has been withdrawn batch-wise, under atmospheric pressure or reduced pressure.

The bottom remaining after the above distillation can then be heated under atmospheric pressure at 130° C. or above to decompose, and the resulting decomposition mixture can, in the same manner as the afore-described suflur trioxide or the liquid containing chlorosulfonyl isocyanate, be charged in the reaction zone beforehand, to which, with stirring or during circulation, cyanogen chloride and sulfur trioxide are fed at the same time to effect reaction.

Other features of the invention will become apparent in the course of the following descriptions of the exemplary embodiments which are given for illustration of the invention and are not intending to be limiting thereof.

EXAMPLES

EXAMPLE 1

A 4-necked flask having a capacity of 200 ml was fitted with a stirrer, a thermometer, a reflux condenser and a gas inlet which was a glass tube having an inside diameter of 6 mm and a length that nearly reached the bottom of the flask. The 4-necked flask thus prepared was charged with 8 g of a liquid sulfur trioxide of γ type (NISSO SULFAN, made by Nippon Soda Co., Ltd.) and, then, the feeding of cyanogen chloride gas and sulfur trioxide was started at the same time with stirring. The cyanogen chloride gas (corresponding to 61.5 g) was fed over 5 hours and the liquid sulfur trioxide (corresponding to 73.1 g) was fed over 4 hours. While they were being fed, the temperature of the reaction zone was kept at 25° to 35° C. by using an external bath. After the feeding of cyanogen chloride had been completed, the reaction zone was stirred for 1 hour at a temperature of 25° to 30° C. After completion of the reaction, the reflux condenser and the gas inlet were taken off from the 4-necked flask, and then a distillation column packed with glass helices and having an inside diameter and a height of 1.5 cm and 17 cm respectively was mounted on the flask. The reaction mixture was distilled with the apparatus thus prepared under atmospheric pressure to give 127 g of chlorosulfonyl isocyanate (purity: 97%) as a fraction at a boiling point of 106° to 107° C./760 mmHg. The yield based on the amount of cyanogen chloride used was 87%.

EXAMPLE 2

A 4-necked flask was charged with 18.6 g of chlorosulfonyl isocyanate and 1.4 g of a liquid sulfur trioxide of γ type. Then, using 61.5 g of cyanogen chloride gas and 80.1 g of the liquid sulfur trioxide, reaction was effected in the same manner as in Example 1, to obtain 143 g of chlorosulfonyl isocyanate (purity: 99%) as a fraction at a boiling point of 55° to 56° C./100 mmHg. The yield based on the amount of cyanogen chloride used was 87%.

EXAMPLE 3

A 4-necked flask was charged with 20 g of a decomposition mixture obtained by distillation by heating at 130° C. or above of the bottoms having remained after distilling off of the chlorosulfonyl isocyanate which had been the product of reaction of sulfur trioxide with cyanogen chloride. Then, reaction was effected in the same manner as in Example 1 using 61.5 g of cyanogen chloride gas and 80.1 g of a liquid sulfur trioxide of $\gamma$ type, to obtain 123 g of chlorosulfonyl isocyanate (purity 95%).

EXAMPLE 4

A 4-necked flask having a capacity of 200 ml was fitted with a circulation circuit connecting the bottom to the neck of the flask, a stirrer, a thermometer, a dropping funnel and a reflux condenser. The circulation circuit, having an intra-circuit capacity of 40 ml, was fitted with a circulation pump and a cyanogen chloride gas inlet.

The 4-necked flask thus prepared was charged with 62.4 g of chlorosulfonyl isocyanate and 120.1 g of sulfur trioxide and, then, the feeding of cyanogen chloride gas (corresponding to 97.0 g) and 120.1 g of an liquid sulfur trioxide of $\gamma$ type was started at the same time, with stirring and circulating. The cyanogen chloride gas was fed over 5.5 hours, while the liquid sulfur trioxide was added dropwise over 5 hours. During the feeding, the temperature of the reaction zone was kept at 20° to 25° C. by using an external bath. After the reaction had been completed, the reaction mixture was distilled under atmospheric pressure through a distillation column packed with glass helices and having an inside diameter and a height of 1.5 cm and 17 cm respectively, to give 267 g of chlorosulfonyl isocyanate (purity: 96%) as a fraction at a boiling point of 106° to 107° C./760 mmHg. The yield based on the amount of cyanogen chloride used was 88%.

EXAMPLE 5

A reaction vessel with a jacket and having a capacity of 100 l was mounted with a circulation circuit having an intra-circuit capacity of 18 l, a stirrer, a thermometer, a sulfur trioxide feed port. The circulation circuit was fitted with a heat exchanger for cooling, a circulation pump and a cyanogen chloride gas inlet.

The reaction vessel thus prepared was charged first with 33.3 kg of a crude chlorosulfonyl isocyanate solution containing 57% by weight of chlorosulfonyl isocyanate, 19% by weight of sulfur trioxide and 22% by weight of chloropyrosulfonyl isocyanate, and then the feeding of a liquid sulfur trioxide of $\gamma$ type and cyanogen chloride gas was started at the same time under circulation of the solution. The liquid sulfur trioxide was fed in an amount of 69 kg at a rate of 11.3 kg/hr and the cyanogen chloride gas in an amount of 55 kg at a rate of 8.4 kg/hr. During the feeding of the sulfur trioxide and the cyanogen chloride, the temperature of the reaction zone was kept at 15° to 22° C. by using an external heat exchanger and the jacket.

After the reaction had been completed, the reaction mixture was distilled under reduced pressure through a distillation column packed with porcelain Raschig rings and having an inside diameter and a height of 20 cm and 2 m, respectively, to give 137 kg of chlorosulfonyl isocyanate (purity: 98%) as a fraction at a boiling point of 56° C./100 mmHg. The yield based on the amount of cyanogen chloride used was 91%.

EXAMPLE 6

The same reaction vessel as used in Example 5 was charged with 30.0 kg of a liquid sulfur trioxide of $\gamma$ type and, then, the feed of a cyanogen chloride gas (corresponding to 65.6 kg) and the liquid sulfur trioxide in an amount of 70.0 kg was started at the same time under circulation. The cyanogen chloride gas was fed over 7.5 hours, while the sulfur trioxide over 4.8 hours. During the feed the temperature of the reaction zone was kept at 15° to 25° C. by cooling. After the reaction has been completed, the reaction mixture was distilled in the same manner as in Example 5, to obtain 135 kg of chlorosulfonyl isocyanate (purity: 95%) as a fraction at a boiling point of 55° to 56° C./100 mmHg. The yield based on the amount of cyanogen chloride used was 84%.

COMPARATIVE EXAMPLE 1

A 4-necked flask having a capacity of 200 ml was fitted with a stirrer, a thermometer, a reflux condenser and a dropping funnel. The 4-necked flask thus prepared was charged with 61.5 g of a liquid cyanogen chloride and the contents was cooled to 0° C. To the contents 80.1 g of sulfur trioxide was added from the dropping funnel over about 1.5 hours. During the addition, the temperature of the reaction zone was kept at 0° C. or below by using an external bath. After the addition, the reaction zone was stirred for 2 hour at a temperature of 25° to 30° C. After completion of the reaction, the reaction mixture was distilled with the same distillation column as used in Example 1 under atmospheric pressure to give 28.3 g of chlorosulfonyl isocyanate (purity: 72%) as a fraction at a boiling point of 104° to 108° C./760 mmHg. The yield based on the amount of cyanogen chloride used was 15%.

COMPARATIVE EXAMPLE 2

To 61.5 g of the liquid cyanogen chloride was added 80.1 g of the sulfur trioxide in the same manner as in Comparative Example 1. After the addition has been completed, the reaction zone was stirred for 2 hours at a temperature of 25° to 30° C. Then, the dropping funnel and the reflux condenser were taken off from the flask and the flask was fitted with a gas inlet of a glass tube having an inside diameter of 6 mm and such a length as to nearly reach the bottom of the flask and the same distillation column as used in Example 1.

While the reaction mixture was being heated at a temperature of 100° to 130° C., about 60 g of cyanogen chloride was streamed into the reaction zone at a rate of about 0.01 mole/min to obtain crude chlorosulfonyl isocyanate as a distillate withdrawn from the top of the distillation column. When the amount of the bottoms in the flask reached about 5 ml, the introduction of cyanogen chloride gas was stopped and the distillation terminated. The crude product obtained was distilled under reduced pressure through the same distillation column used in Example 2, to give 77.9 g of chlorosulfonyl isocyanate (purity: 87%) as a fraction at a boiling point of 52° to 56° C./100 mmHg. The yield based on the amount of cyanogen chloride used was 48%.

COMPARATIVE EXAMPLE 3

A 4-necked flask having a capacity of 200 ml was fitted with a stirrer, a thermometer, a reflux condenser and a gas inlet of a glass tube having an inside diameter of 6 mm and a length nearly reaching the bottom of the flask. The 4-necked flask thus prepared was charged with 79.5 g of a liquid sulfur trioxide of γ type and, then, cyanogen chloride gas (corresponding to 62.9 g) was introduced over 2 hours with stirring. During the addition, the temperature of the reaction zone was kept at 25° to 35° C. by using an external bath. After the addition has been completed, the reaction zone was stirred for 0.5 hour at a temperature of 25° to 30° C. After completion of the reaction, the reflux condenser and the gas inlet tube were removed from the 4-necked flask, and a distillation column packed with glass helices and having an inside diameter and a height of 1.5 cm and 10 cm respectively was fitted to the flask. The reaction mixture was distilled under atmospheric pressure to give 119.1 g of chlorosulfonyl isocyanate (purity: 90%) as a fraction at a boiling point of 106° to 107° C./760 mmHg. The yield based on the amount of cyanogen chloride used was 76%.

COMPARATIVE EXAMPLE 4

The same apparatus as used in Comparative Example 3 was used. The flask was charged with 79.5 g of a liquid sulfur trioxide of γ type and, then, 68.0 g of cyanogen chloride gas was introduced over 1 hour with stirring. During the addition the temperature of the reaction zone was controlled to be within a range of 20° to 48° C. by using an external bath. After the addition the reaction zone was stirred for 1 hour at 30° C. Then, the reaction mixture was distilled under a reduced pressure of 100 mmHg through the same distillation column as in Comparative Example 3, to give 104.2 g of chlorosulfonyl isocyanate (purity: 95%) as a fraction at a boiling point of 55° to 56° C./100 mmHg. The yield based on the amount of cyanogen chloride used was 70%.

COMPARATIVE EXAMPLE 5

The same apparatus as used in Comparative Example 3 was used. The flask was charged with 117.6 g of a liquid sulfur trioxide of γ type and, then, 89.7 g of cyanogen chloride gas was introduced over 6 hour with stirring. During the addition the temperature of the reaction zone was adjusted to be 25° to 30° C. by using an external bath. After the addition the reaction zone was stirred for 0.5 hour at 25° to 30° C. Then, the reaction mixture was distilled under atmospheric pressure through the same distillation column as used in Comparative Example 3, to give 91.2 g of chlorosulfonyl isocyanate (purity: 85%) as a fraction at a boiling point of 106° to 108° C./760 mmHg. The yield based on the amount of cyanogen chloride used was 38%.

COMPARATIVE EXAMPLE 6

The same apparatus as in Comparative Example 3 was used. The flask was charged with 79.5 g of a liquid sulfur trioxide of γ type and, then, 89.7 g of cyanogen chloride gas was introduced over 10 seconds with stirring. During the addition, the temperature of the reaction zone was adjusted to be within a range of 20° to 48° C. by using an external bath. After the addition, the reaction zone was stirred for 1 hour at 25° to 30° C. Then, the reaction mixture was distilled under atmospheric pressure through the same distillation column as used in Comparative Example 3, to give 68.8 g of chlorosulfonyl isocyanate (purity: 96%) as a fraction at a boiling point of 106° to 107° C./760 mmHg. The yield based on the amount of cyanogen chloride used was 47%.

Obviously, numerous modifications and variations of the present invention are possible in light of the above teachings. It is therefore to be understood that within the scope of the appended claims, the invention may be practiced otherwise than as specifically described herein.

What is claimed is:

1. In a batch process for producing chlorosulfonyl isocyanate by reacting sulfur trioxide with cyanogen chloride, the improvement which comprises: feeding sulfur trioxide and cyanogen chloride simultaneously to the reaction zone and maintaining the temperature of the reacting zone at 10° to 50° C.

2. A process for producing chlorosulfonyl isocyante according to claim 1, wherein the reaction zone is charged with sulfur trioxide or an inert liquid containing chlorosulfonyl isocyanate prior to the start of the simultaneous feeding of sulfur trioxide and cyanogen chloride.

3. A process for producing chlorosulfonyl isocyante according to claim 2, wherein said liquid containing chlorosulfonyl isocyanate contains chlorosulfonyl isocyanate in an amount of at least 40% by weight.

4. A process for producing chlorosulfonyl isocyanate according to claim 1, wherein the reaction zone is charged beforehand with a distilled mixture obtained by heating and decomposing the bottoms remaining after distillation of crude chlorosulfonyl isocyanate obtained by reaction of sulfur trioxide with cyanogen chloride.

5. A process for producing chlorosulfonyl isocyante according to any one of claims 1 through 4, wherein cyanogen chloride is fed per unit time in a mole ratio based on the mole of sulfur trioxide of 0.6 to 1.1 during the simultaneous feeding of sulfur trioxide and cyanogen chloride.

6. A process for producing chlorosulfonyl isocyante according to claim 5, wherein cyanogen chloride is fed per unit time in a mole ratio based on the mole of sulfur trioxide of 0.8 to 1.0.

* * * * *